July 25, 1944.  J. P. MINTON  2,354,420

CONTRACTOR-EXPANDER FOR ELECTRIC SEISMOGRAPHS

Filed Dec. 16, 1937  3 Sheets-Sheet 1

Inventor
John P. Minton
By Dallas R. Lamont
Attorney

July 25, 1944.                J. P. MINTON                2,354,420
            CONTRACTOR-EXPANDER FOR ELECTRIC SEISMOGRAPHS
                    Filed Dec. 16, 1937        3 Sheets-Sheet 2
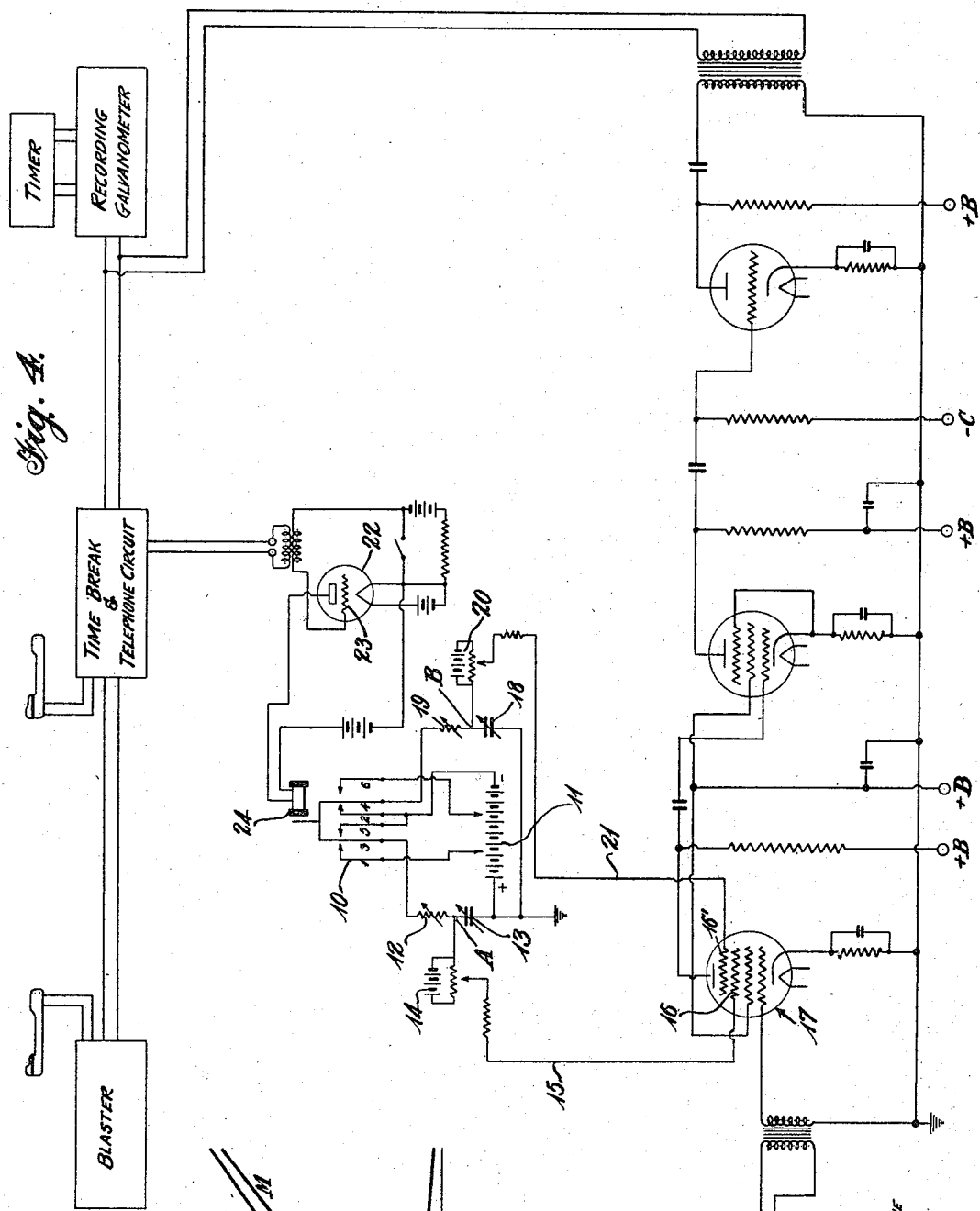
Inventor
John P. Minton
By Dallas R. Lamont
                Attorney July 25, 1944.  J. P. MINTON  2,354,420
CONTRACTOR-EXPANDER FOR ELECTRIC SEISMOGRAPHS
Filed Dec. 16, 1937  3 Sheets-Sheet 3

Inventor
John P. Minton
By Dallas R. Lamont
Attorney

Patented July 25, 1944

2,354,420

UNITED STATES PATENT OFFICE 2,354,420

CONTRACTOR-EXPANDER FOR ELECTRIC SEISMOGRAPHS

John P. Minton, Dallas, Tex., assignor, by mesne assignments, to Socony-Vacuum Oil Company, Incorporated, New York, N. Y., a corporation of New York Application December 16, 1937, Serial No. 180,113

9 Claims. (Cl. 177—352)

This invention relates generally to a method and apparatus for surveying the subsurface strata of the earth by the use of artificially created seismic waves, and more particularly to the method and apparatus for recording all the data on a single spread when shot in one direction by detonating a single charge of explosive.

In the art of exploring subsurface strata by the use of artificially created seismic waves, it is customary to detonate a charge of explosives at a point on or near the earth's surface and record the seismic waves generated by the detonation of the explosives at predetermined points removed from the point of generation. From the data thus recorded it is possible to ascertain the depth of subsurface horizons, from which the seismic waves that are recorded have been reflected. The depths of these subsurface horizons are computed from the velocity at which the seismic waves travel down to the reflecting horizon and return to the detecting instrument. This velocity will vary, dependent upon the density and elastic coefficients of the materials through which it travels. In addition to considering the velocity at which reflected waves will travel in subsurface strata, it is necessary to consider the velocity of their transmission through the unconsolidated, weathered, sedimentary surface of the earth.

The usual procedure when the exploration of an area is begun is to develop these velocities in the different strata by what is termed a "velocity program" which entails recording records of seismic waves which will give directly the velocities in these particular strata. After having once ascertained these velocities, they can be used throughout the area in computing the depth of the particular reflecting strata. Due to the fact that the weathered surface layer of the earth varies in thickness, it is necessary that the thickness of this weathered layer be computed for each spread or location of geophones. To obtain the data from which the thickness of the weathered layer is computed, charges of explosives are detonated at the selected shot points and the velocity of the wave travel through the weathered or surface layer is determined. Due to the fact that the wave in which we are first interested travels substantially in a direct route to the detector, there is very little absorption present and an impulse of great amplitude is recorded. It is necessary that the gain in amplification of a vacuum tube amplifier be at the maximum in order that the break in the seismogram trace, resulting from the arrival at the geophone of the first impulse of energy, be very definite. As a consequence heretofore, it has been necessary to record these data on a separate seismogram from that on which reflected waves are recorded. Such a procedure would necessitate recording a plurality of seismograms to obtain the data in the weathered layer and records of the reflected waves from shallow subsurface strata. Since the high cost of field operations makes the time factor of paramount importance, it is desirable to record all of these data on a single record from the detonation of a single charge of explosives. Such a procedure would result in tremendous savings in the amount of explosives required and in the time required by the field party to record the data necessary on a single spread, as well as the time required for an interpreter to observe the data on a plurality of seismograms.

With previous methods of recording these data by the use of a plurality of charges of explosives, from which seismic waves have been recorded on a corresponding number of seismograms, it has been almost impossible to duplicate the conditions under which each charge of explosive is detonated, due to several factors, the most important of which being the changes in the conditions affecting the medium in which the shot is planted. When one charge of explosives is detonated in the bottom of a shot hole, a pocket or cavity is formed in some formations, while in others the bottom of the hole is filled up, due to the fact that the medium forming the walls of the cavity is of loosely packed material. This sometimes results in a loss of as much as 10' in the depth of the hole, and, in extreme cases, where the bottom of the hole is in a quick sand material, as much as 20' or 30' of the hole are lost by the detonation of a single charge in it. Such changes in conditions under which successive charges of explosives are detonated introduce variable factors in the apparent velocities of the recorded waves. These variable factors would make profiles computed from these data in error.

Therefore, the primary object of this invention is the provision of a method and apparatus whereby all the data that it is required to be recorded on a particular spread when shot from one direction can be recorded on a single seismogram.

Another object of this invention is in the provision of a method and apparatus for controlling the gain in amplification to effect a definite recording of first impulses and reflected waves from shallow as well as deep horizons.

Still another object of this invention is in the provision of means whereby the vacuum tube amplifier is allowed to remain at or near its maximum sensitivity until the first impulse of the direct traveling waves has been recorded; then suppressing the gain in amplification exponentially with time and then allowing it to expand exponentially with time.

This invention further contemplates means whereby the suppression of the gain in amplification can be initiated by the impulse delivered to the geophone by the direct traveling waves.

This invention has for another of its objects the provision of means whereby the suppression of the gain in amplification can be initiated by the electrical impulse that is received and recorded at the instant of detonation of the charge of explosives.

Still another object of this invention is in the provision of means, the operation of which can be initiated by the discharge of a gas triode vacuum tube, or by a relay, or manually with switches.

This invention also contemplates the provision of means which will operate on either the control or suppressor grid of a conventional vacuum tube in one or more stages of the conventional amplifier to effect the above mentioned results.

Another object of the invention is in the provision of a unit for effecting these results which can be utilized with a conventional amplifier.

Still another object of this invention is the provision of a master control for seismograph amplifiers that will gradually change the grid bias on two suppressor grids independently in a vacuum tube in an amplifier to effect a simultaneous action of suppression and expansion of the gain in amplification resulting in an amplification characteristic for the tube that will start using a high value of gain in amplification then decrease to a predetermined minimum value and automatically increase to a predetermined high value over a controllable period of time.

Other objects and advantages will become apparent from the following detailed descriptions, when considered with the attached drawings, in which:

Figure 1 is an illustration of a seismogram such as would be recorded by using the control forming the subject matter of this application in connection with an electric seismograph amplifier;

Figure 2 is the illustration of an oscillogram that would result from passing a wave of constant frequency and amplitude through a seismograph amplifier while employing the control described in this application showing the manner in which the gain in amplification is caused to be suppressed exponentially with time over a predetermined period of time and then automatically expanded exponentially with time over a predetermined period;

Figure 3 is a group of curves which have been plotted with gain in amplification as ordinates and time as abscissae;

Figure 4 is a composite drawing of an electric seismograph showing the control applied to two suppressor grids that are in one vacuum tube of a conventional amplifier.

Figure 1:
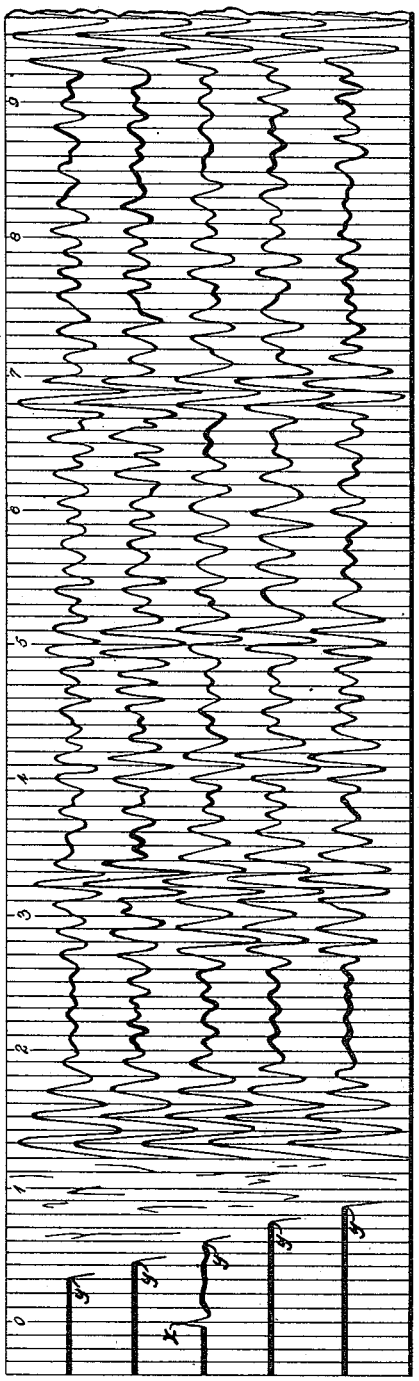

Referring to the drawings in detail particularly Figure 1 there is illustrated a seismogram which shows the manner in which the gain in amplification can be controlled by using the control forming the subject matter of this application in connection with an electric seismograph amplifier. The transverse lines indicate definite small intervals of time such for example as .01 of a second. The break in the seismogram trace at X indicates the instant at which detonation of the explosion which generates seismic waves occurs. The periods of time elapsing between this indication X and the discontinuities Y on the traces are represented by the number of spaces and fractions thereof between them and the time break. To record a record such as that illustrated, the charge of explosive and the five geophones are located in the same vertical plane the geophones being placed on one side of the shot point and equidistantly spaced one from the other. The discontinuities Y in the traces are indicative of the instants at which the first energy strikes the respective geophones.

Although these first initial impulses are generated by direct traveling waves of abrupt wave front, there are many other waves of different frequencies and velocities that follow. Due to the fact that these direct traveling waves are of so much greater amplitude than reflected waves, their attenuated wave train would tend to obscure reflected waves from shallow horizons that would arrive at the geophone or detector a relatively short interval of time after the first impulse. From this it becomes apparent that some means must be provided for controlling both the amplification of the direct traveling waves after the first impulse has been recorded and the amplitude of succeeding reflected waves. Such control of amplification is illustrated in Figure 1. In this illustration it is further shown that the first arrival of energy to the detector or geophone is recorded on the seismogram at an amplitude corresponding to the maximum amplification for which the amplifier is used. Additionally, it is shown that after the first energy is recorded on all traces of the seismogram, the gain in amplification is suppressed in all of the amplifiers to some small value. Then from this period the gain is expanded exponentially with time, resulting in a record that is uniformly trimmed showing reflections which have been recorded with almost constant amplitude from horizons as deep as it is practicable to correlate or profile and at the same time gives definite first breaks from the direct traveling waves from which the thickness of the weathered layer of the earth's surface in the vicinity of the geophone or detector can be computed. Since these are all the data which are required from seismic waves which have been recorded in one direction on a particular spread, there is no necessity for detonating more than one charge of explosive and recording more than one seismogram. This obviously results in a tremendous saving in time, explosives, and a saving in depreciation of equipment.

Figure 2:
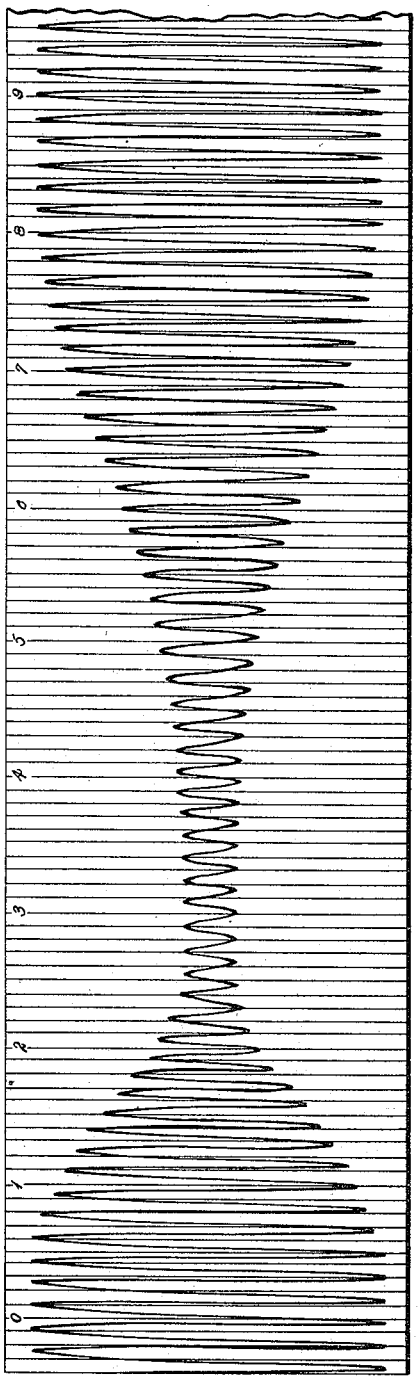

To obtain a seismogram such as that illustrated in Figure 1, it is desirable to have the amplification characteristic of the vacuum tube amplifier such that it will function as illustrated in Figure 2. In this figure there is shown an oscillogram such as would result from applying a constant frequency and constant amplitude voltage wave to the amplifier while using the control. The amplification characteristic of the amplifier would be as illustrated by the curve C in Figure 3.

Figure 5:
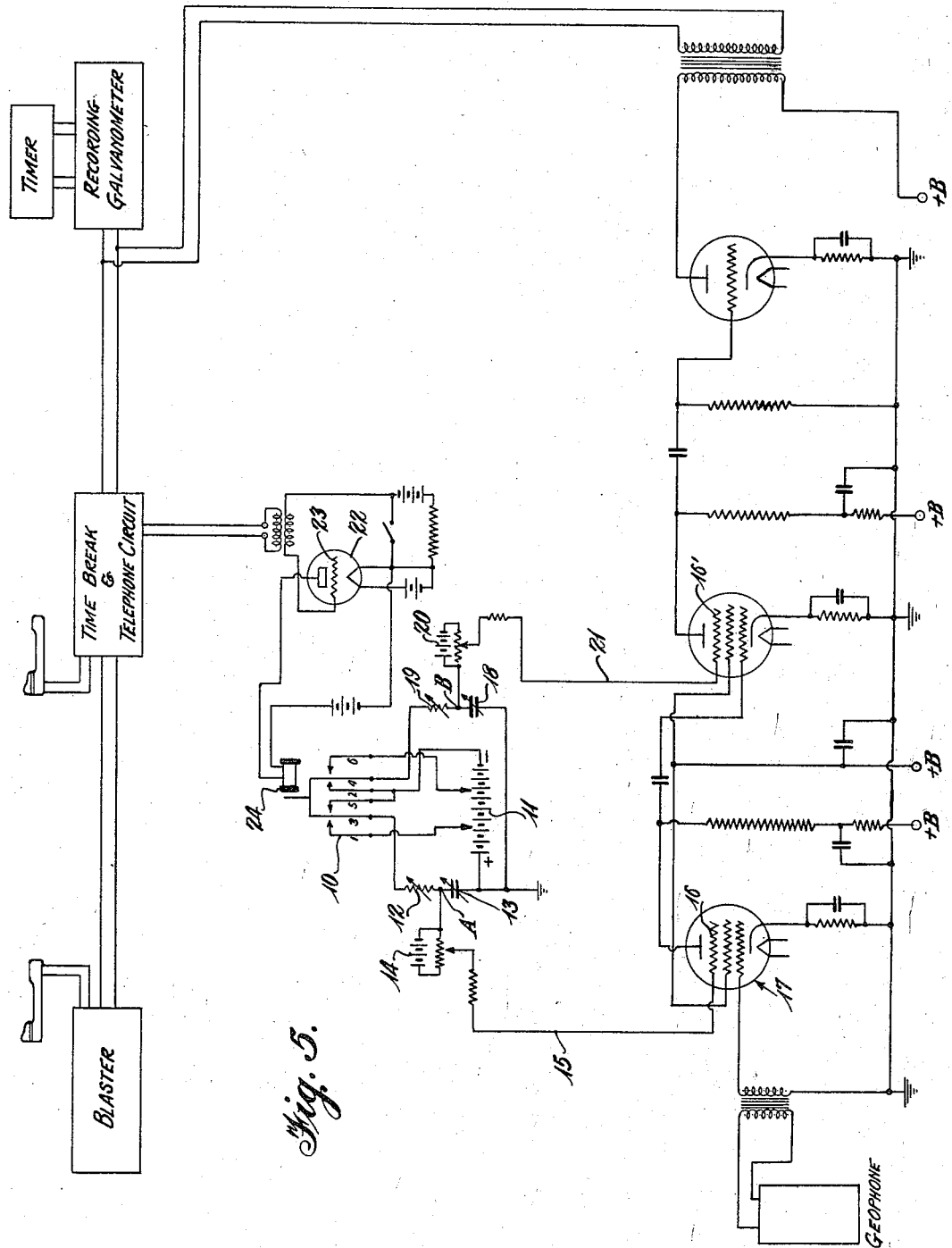
Figure 5 is a second composite diagram of an electric seismograph showing the control applied to the suppressor grids of two tubes in a conventional seismograph amplifier.

In the circuit diagrams illustrated in Figures 4 and 5 there are shown time lag circuits, which, when incorporated into a vacuum tube amplifier and initiated by the flow of plate current in a gas triode tube, will cause a contraction and expansion in amplification. In operation the double pole switch 10 is thrown to the left for its initial position. This will complete circuits through contacts 1 and 3, and 2 and 4. The circuit thus completed by contacts 1 and 3 is from ground potential to the positive terminal of the battery 11 through a portion of the battery 11 to contact #1, then from contact #3 through a variable resistor 12 and variable condenser 13 back to the point of zero potential or ground. The circuit thus formed is the charging circuit for the variable condenser 13. When the variable condenser 13 has become fully charged, the point A relative to ground assumes a negative potential equal to that portion of the battery used. This negative potential is equalized, brought to zero or a predetermined small value by the battery 14. Thus it can be seen that if the lead 15 is connected to the suppressor grid of a vacuum tube in the amplifier, no bias or a predetermined small bias will be present on the grid 16 of the vacuum tube 17.

At the same time the double pole switch is thrown to the left to make the circuit through contacts 1 and 3, there is also a circuit made between the contacts 2 and 4, which is the charging circuit for the condenser 18. It will be noted that this circuit is from the ground to the plus terminal of the battery 11 through the entire battery to contact #2 of the switch through the switch and from contact #4 through the variable resistor 19 and variable condenser 18 back to ground. In this circuit the entire potential of the battery 11 is placed across the variable condenser 18, which, when fully charged, will bring the point B in this circuit to a negative potential equal to that of the entire battery bank 11. This negative potential can be adjusted by the battery 20 to any value that is desired. If the lead 21 is also connected to a suppressor grid in the same tube or another tube of an amplifier, a negative potential will be placed upon this tube which will cause it to operate so low on its amplification curve that very little gain, if any, will be derived from this tube.

The conditions described above in the two preceding paragraphs are those existing in the circuit before the shot is detonated. The double pole switch is shown for purpose of explanation, and could just as well be a relay operated by the plate current from a gas triode tube 22. Due to the well known characteristics of the gas triode tube, it is possible to use a signal from the blasting circuit that is generated at the time the shot is detonated to place a positive bias on the grid 23 of the gas triode to cause it to discharge, thereby causing current to flow in the plate circuit. This plate circuit current is then utilized to trip a relay 24 to change the double pole switch 10 or its equivalent from the contacts 1 and 2 over to the right to contacts 5 and 6. This occurs at the instant of detonation of the shot. When the charging circuit through contacts 4 and 6 is completed, instead of having the entire battery 11 impressed across the variable condenser 18, at this instant only a portion of the battery 11 is impressed across the condenser. As a result the point B of the circuit will have a tendency to assume a negative potential equal in value to that of that portion of the battery 11 which remains in the circuit. Since this potential has been changed from a relatively large negative value to a smaller negative value, the potential on the suppressor grid from the lead 21 will vary slowly as the condenser 18 discharges through the variable resistor 19 until the charged potential of the condenser 18 has reached a value equal to that at the point B. Causing the suppressor grid voltage to vary in accordance with the rate of discharge of the condenser 18 will cause a gain in amplification to go from some low value to a predetermined maximum value.

At the same instant that the circuit is made through contacts 4 and 6, there is also a circuit made through contacts 3 and 5, which forms a charging circuit for the condenser 13. It will be noted that the potential across 13 has now changed from a portion of the battery 11 to that of the entire battery 11. Since the point A in the circuit relative to the ground had a negative potential equal to a portion of the battery 11 originally, its negative potential will now be increased as the condenser 13 becomes fully charged to a point that will be equal to that of the entire battery 11, thereby causing a gradual increase, in the negative direction, of the potential impressed on the suppressor grid by the lead 15.

The operation of the circuit when the switch is thrown to the right by the signal from the blaster circuit is that the potential placed on the suppressor grid by the lead 15 in the manner described above will vary from a zero or small value to a chosen negative value, which, in turn, will cause a proportionate variation in the amplification from its maximum value to a predetermined minimum value. At the same time the potential on the suppressor grid, as supplied by the lead 21, will change gradually from some predetermined negative value to a very small or zero value, causing a proportional change in the gain of amplification from a predetermined low value to a maximum value.

With the suppressor grid voltages on tube #1 varying in the above described manner, the gain in amplification curve N plotted against time as abscissae will start at some maximum value and decrease exponentially with time. Simultaneously the gain in amplification as controlled by the grid potential as supplied by lead 21 will tend to be as represented by the curve M, which will start at some minimum value and increase exponentially with time to some controlled negative value. The resultant of these two curves will be as is illustrated by curve C (Figure 3). By varying the values of the variable resistors 12 and 19, the slope of these curves can be controlled in such a manner that the low point and period of time required for the curve to reach the high point again can be definitely controlled.

As shown in Figures 4 and 5 the above described controlled circuit is applicable to a vacuum tube in an amplifier having two independent suppressor grids, or to the suppressor grids in two or more separate tubes of a conventional amplifier or to the control grids of conventional triode tubes.

I claim:

1. In an electric seismograph having a vacuum tube amplifier having at least two gain-control grids, a geophone connected to the input of said amplifier, a recording galvanometer connected to the output of said amplifier, means operable upon production of seismic waves for generating a signal, and means actuated by the signal for gradually and concurrently varying the grid potential in opposite directions on at least two grids in at least one of the tubes in the vacuum tube amplifier to effect a corresponding contraction and thereafter an expansion in amplification by the amplifier at such a rate that all phases of the record made by said recording galvanometer are of usable amplitude.

2. An electric seismograph for recording seismic waves of differing amplitude comprising in combination a vacuum tube amplifier, a geophone connected to the input of said amplifier, a recording galvanometer connected to the output of said amplifier, means responsive to creation of said seismic waves for concurrently effecting a gradual variation of the grid bias on at least two tubes in a vacuum tube amplifier, the variation of the grid bias on one of said tubes being in a positive direction while that of the other is in the negative direction, the sum of the effects of said variations of grid bias producing a usable record of said seismic waves of differing amplitude.

3. In a seismograph system having a detector of seismic waves transmitted through the earth, an electrical recorder of said waves, and a thermionic amplifier interconnecting said detector and said recorder, said amplifier having a plurality of gain-control grids, the combination of control means for said amplifier comprising means for simultaneously varying the grid potentials on said grids in opposite directions in a manner such that the sum of the effects of such variations produces a change in amplification at a time rate which yields a record all phases of which are of usable amplitude.

4. In a seismograph system having a detector of seismic waves transmitted through the earth, an electrical recorder of said waves, and a thermionic amplifier interconnecting said detector and said recorder, said amplifier having a plurality of gain-control grids, the combination of control means for said amplifier comprising electrical circuit means for simultaneously varying the grid potential on one of said grids in a positive direction and on the other of said grids in a negative direction in a manner such that the sum of the effects of such variations produces first a contraction and then an expansion of the amplification at a time rate which yields a record all phases of which are of usable amplitude.

5. In a seismograph system having a detector of seismic waves transmitted through the earth, an electrical recorder of said waves, and a thermionic amplifier interconnecting said detector and said recorder, said amplifier having a plurality of gain-control grids, the combination of control means for said amplifier comprising electrical circuit means for simultaneously varying the grid potential on one of said grids in a positive direction and on the other of said grids in a negative direction in a manner such that the sum of the effects of such variations produces first a contraction and then an expansion of the amplification at a time rate which yields a record all phases of which are of usable amplitude, and means including a circuit controller for producing a low-gain bias on one grid and a high-gain bias on the other grid in one circuit controlling condition and in another circuit controlling condition initiating operation of said electrical circuit means.

6. In a seismograph system having a detector of seismic waves transmitted through the earth, an electrical recorder of said waves, and a thermionic amplifier interconnecting said detector and said recorder, said amplifier having a plurality of control grids in cascade, the first of which is operatively connected to said detector, and separate gain-control grids, the combination of control means for said amplifier comprising means including a condenser and a resistor for varying the grid potential on one of said gain-control grids in a positive direction and a condenser and a resistor for simultaneously varying the potential on another of said gain-control grids in a negative direction the sum of the effects of said varying potentials producing first a contraction and then an expansion of the amplification of the detected waves at a time rate which yields a record all phases of which are of usable amplitude.

7. In a seismograph system having a detector of seismic waves transmitted through the earth, an electrical recorder of said waves, and a thermionic amplifier interconnecting said detector and said recorder, said amplifier having a plurality of gain-control grids, the combination of means including a condenser and a resistor effectively in shunt therewith and both connected to a source of constant potential for varying the bias on one of said control grids to produce a progressively decreasing gain in amplification, a condenser and a discharge resistor effectively in shunt therewith for concurrently varying the bias on another of said control grids to produce a progressively increasing gain in amplification, said resistors and condensers having relative values such that the overall characteristic of the amplifier is first a contraction of amplification of detected seismic waves and then an expansion of amplification thereof for the production of a seismic record all phases of which are of usable amplitude.

8. In a seismograph system having a detector of seismic waves transmitted through the earth, an electrical recorder of said waves, and a thermionic amplifier interconnecting said detector and said recorder, said amplifier having a plurality of gain-control grids, the combination of a first electrical circuit means having the characteristic of controlling the decay of an electrical potential exponentially with time, a second electrical circuit means having the characteristic of controlling the rise of an electrical potential exponentially with time, means for respectively connecting said first and said second electrical means to separate gain-control grids for negatively biasing them, means for applying a predetermined potential to said first means preparatory to controlled decay thereof, means operable upon removal of said applied potential to apply a potential to said second means for controlled rise of said potential concurrently with decay of the potential of said first means, the respective decay and rise of said applied potentials producing first a contraction and then an expansion of the amplification of seismic waves received by said detector at a time rate which compensates for exponential rise and decay in the intensity of signals received by said detector.

9. In a seismograph system having a detector of seismic waves transmitted through the earth, an electrical recorder of said waves, and a thermionic amplifier interconnecting said detector and said recorder, said amplifier having a plurality of gain-control grids, the combination of a first electrical circuit means having the characteristic of controlling the decay of an electrical potential exponentially with time, a second electrical circuit means having the characteristic of controlling the rise of an electrical potential exponentially with time, means for respectively connecting said first and said second electrical means to separate gain control grids for negatively biasing them, means for applying a predetermined potential to said first means preparatory to controlled decay thereof, means operable upon removal of said applied potential to apply a potential to said second means for controlled rise of said potential simultaneously with decay of the potential of said first means, the respective decay and rise of said applied potentials producing first a contraction and then an expansion of the amplification of seismic waves received by said detector at a time rate which compensates for exponential rise and decay in the intensity of signals received by said detector, and separate biasing means for each gain-control grid for establishing a predetermined bias when said electrical means are ineffective.

JOHN P. MINTON.